(12) United States Patent
Dietrich et al.

(10) Patent No.: US 7,430,075 B2
(45) Date of Patent: Sep. 30, 2008

(54) CONDENSER ARRANGEMENT FOR BRIGHTFIELD ILLUMINATION AND/OR DARKFIELD ILLUMINATION FOR OPTICAL MICROSCOPES

(75) Inventors: Peter Dietrich, Oberkochen (DE); Michael Brehm, Goettingen (DE); Heino Heise, Adelebsen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 258 days.

(21) Appl. No.: 11/193,845

(22) Filed: Jul. 29, 2005

(65) Prior Publication Data
US 2006/0023301 A1 Feb. 2, 2006

(30) Foreign Application Priority Data
Jul. 29, 2004 (DE) .................. 10 2004 036 863

(51) Int. Cl.
*G02B 21/14* (2006.01)
(52) U.S. Cl. ........................ 359/381; 359/368
(58) Field of Classification Search .................. 359/368, 359/381
See application file for complete search history.

(56) References Cited

U.S. PATENT DOCUMENTS

| | | | |
|---|---|---|---|
| 2,565,419 A | 8/1951 | Aitcheson et al. | |
| 2,642,775 A | 6/1953 | Rooney et al. | |
| 2,674,157 A | 4/1954 | Heine et al. | |
| 4,109,304 A | 8/1978 | Khvalovsky et al. | |
| 4,807,980 A | 2/1989 | Dietrich et al. | |
| 5,042,928 A | 8/1991 | Richards | |
| 5,128,808 A | 7/1992 | Dosaka | |
| 6,905,838 B1* | 6/2005 | Bittner | 435/29 |
| 2001/0003489 A1* | 6/2001 | Shiba et al. | 359/383 |
| 2002/0191281 A1* | 12/2002 | Osa et al. | 359/385 |

FOREIGN PATENT DOCUMENTS

| | | |
|---|---|---|
| DE | 603 322 | 9/1931 |
| DE | 608 644 | 1/1935 |
| DE | 721 942 | 6/1942 |
| DE | 830 840 | 2/1952 |
| DE | 1 123 134 | 2/1962 |

(Continued)

*Primary Examiner*—Joshua L Pritchett
(74) *Attorney, Agent, or Firm*—Reed Smith LLP

(57) ABSTRACT

A condenser arrangement for brightfield illumination and/or darkfield illumination for optical microscopes comprises in a housing basic optics having at least one lens, at least one front optics which can be inserted into the illumination beam path in front of the basic optics, and means for inserting the front optics into the illumination beam path of the microscope. A first swiveling arm and a second swiveling arm are swivelably arranged at the housing of the condenser. The first swiveling arm carries first front optics with a high aperture for brightfield illumination and the second swiveling arm carries second front optics for darkfield illumination. The two swiveling arms are arranged at a defined distance from the shared basic optics of the condenser in direction of the optical axis of the illumination beam path. An aperture iris diaphragm is provided on the object side in front of the basic optics and is opened when the cardioid optics are inserted. Further, a darkfield slide with an annular mirror element is provided on the object side at the housing. Operator's controls serve to swivel the two swiveling arms for moving the darkfield slide and for adjusting the aperture iris diaphragm.

5 Claims, 13 Drawing Sheets

FOREIGN PATENT DOCUMENTS

| | | |
|---|---|---|
| DE | 24 10 874 | 6/1975 |
| DE | 34 25 674 | 1/1986 |
| DE | 37 00 965 | 7/1988 |
| JP | 10-268205 | 10/1998 |
| JP | 11-153755 | 6/1999 |
| JP | 2002-006224 | 1/2002 |

* cited by examiner

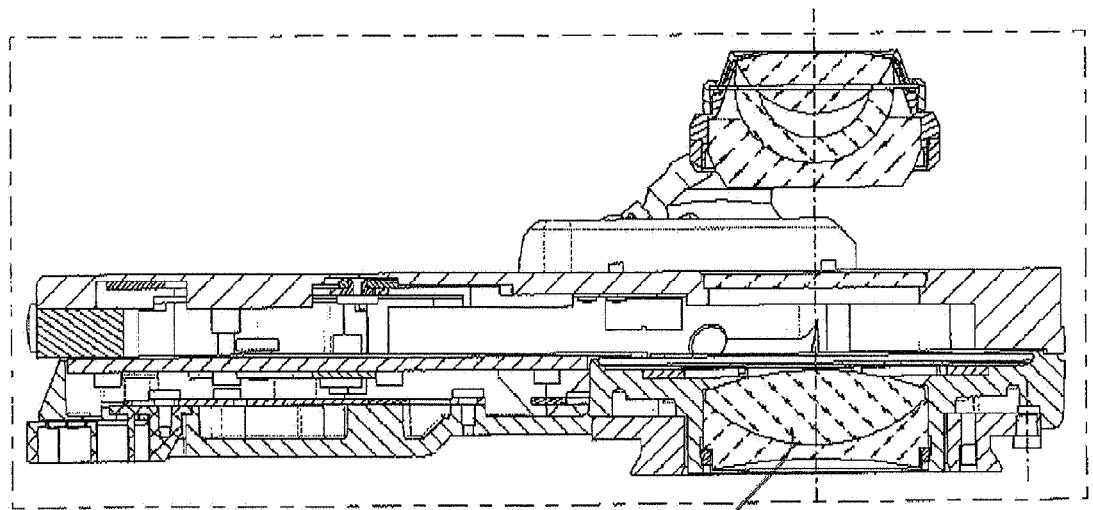
Fig. 1e    15
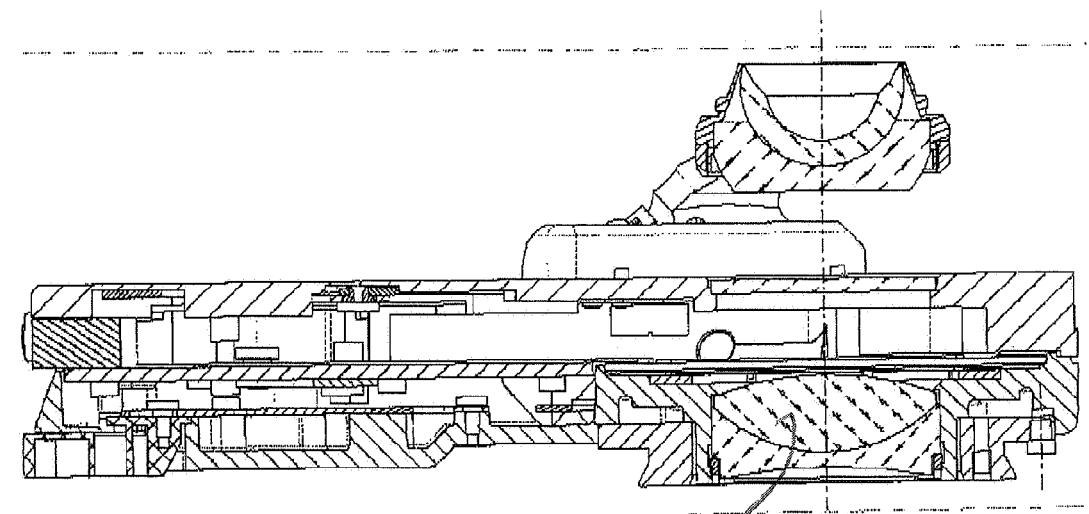
Fig. 1f    15

CONDENSER ARRANGEMENT FOR BRIGHTFIELD ILLUMINATION AND/OR DARKFIELD ILLUMINATION FOR OPTICAL MICROSCOPES

CROSS-REFERENCE TO RELATED APPLICATIONS

This application claims priority of German Application No. 10 2004 036 863.5, filed Jul. 29, 2004, the complete disclosure of which is hereby incorporated by reference.

BACKGROUND OF THE INVENTION a) Field of the Invention

The invention is directed to a condenser arrangement for brightfield illumination and/or darkfield illumination for optical microscopes with a device for switching from brightfield illumination to darkfield illumination and cardioid condenser-type darkfield illumination optics suitable for this purpose.

b) Description of the Related Art

For the microscope user, it is important to view object details with different contrasts which can be realized by different types of illumination, e.g., brightfield illumination and/or darkfield illumination of the objects, in order to obtain more information from the object from different viewing angles. For example, alternating use of transmitted brightfield illumination and transmitted darkfield illumination of one and the same object detail is extremely informative. For example, in the clinical or biological laboratory, as well as in other areas, applications frequently aim at the identification and detection of structures that may be below the resolution limit of the microscope. In certain cases, it is impossible to detect a structure or to display it adequately when using only one contrast in brightfield.

In darkfield illumination in optical microscopy, the object to be observed is illuminated laterally so that the light scattered at the object can be observed through the optics of the microscope and evaluated. Using darkfield illumination, determined object structures can be brought out clearly and very small objects can be detected.

Alternate switching of an alternative contrast, preferably darkfield, is often useful. In practice, a satisfactory solution is reached when both types of illumination achieve the following performance features:

Brightfield: High aperture for good resolution and a large object field for detecting the largest possible section of the object.

Darkfield: Very high illumination aperture for detection of submicroscopic structures and the illumination of large object fields in darkfield for detecting the largest possible section of the object.

Methods and arrangements for the use of brightfield illumination and darkfield illumination individually and in combination with different condensers are known.

For example, DE 37 00 965 A1 discloses an illumination device which uses condensers with swivelable front optics for brightfield illumination with switching between a high aperture and small object field on one hand and a small aperture and large object field on the other hand. The darkfield illumination is carried out through a central annular diaphragm in the aperture diaphragm plane and in the condenser pupil, respectively. This solution functions only for a limited magnification range of the objectives.

Zeiss and Leica also offer devices that permit alternate switching between brightfield and darkfield in a combination condenser.

However, all of these arrangements have disadvantages with respective to alternative use. With special condensers, only brightfield is possible in the entire magnification range under optimum field conditions and aperture conditions, or only a rotationally symmetric darkfield in the medium magnification range or one-sided darkfield for low magnifications can be realized satisfactorily. While the combination condenser does deliver a good brightfield, the quality of the darkfield is limited. Another disadvantage of many combination condensers in which the aperture iris and turret plate are arranged with additional contrast elements at different heights in the beam path (condenser U-UCD 8, Olympus, Japan) consists in that the aperture diaphragm must be readjusted when switching to brightfield. It is necessary to adjust to the original diameter of the diaphragm again in order to realize the identical contrast conditions. An absolutely identical image impression can be achieved only with difficulty because the adjustment is judged subjectively. When changing from brightfield to other contrasts, e.g., darkfield, the aperture diaphragm must be opened completely in order to open the illumination channel at the annular diaphragm. This is also true for brightfield at low magnifications when the front optics of the condenser are eliminated.

Various optical arrangements are known for realizing a darkfield illumination of microscopic objects with or without the intermediary of an immersion liquid.

For example, illumination of this kind can be realized through the use of suitable annular diaphragms in the entrance-side condenser pupil.

To achieve this same goal, JP 10268205 discloses plane mirror arrangements which deflect the light into the object plane by means of stepped reflectors or light ladders with a high aperture.

Further, there are known cardioid systems with curved reflecting surfaces enabling aplanatic illumination of the object plane with a high aperture.

JP 11153755 discloses the use of a ring of toric micromirrors that deflects the light to the object plane at a high aperture.

An arrangement of concave and convex annular mirrors for darkfield illumination in microscopes is known from DR 830 840 and DE 24 10 874. All of these arrangements have the disadvantage that only relatively small object fields can be illuminated and, therefore, they are suitable only for high magnifications.

In order to illuminate larger object fields as well, DE 34 25 674 proposes providing a toroidal annular mirror. It is disadvantageous that the illumination is inhomogeneous for larger object fields and an additional diffusion plate must be used for homogenization. However, this reduces the light yield in the object plane.

Further, DR 608 644 describes a condenser in which pyramid-shaped partial mirror surfaces which face one another are used as main mirrors and complementary mirrors. Because of the principle employed, this arrangement also has inhomogeneities in the illumination. Further, it is difficult to realize the concave mirror as a segmented mirror with the required accuracy.

For low magnifications, there are also known solutions which use a stepped mirror with three mirror surfaces, one of which has stamped, toric micromirrors.

In the past, different illumination optics have always been used to achieve a darkfield illumination, with or without the use of immersion, because it is very difficult at high numerical apertures and high magnifications to realize optical arrangements which are suitable for both dry illumination and immersion illumination in darkfield.

OBJECT AND SUMMARY OF THE INVENTION

It is the primary object of the invention to provide a condenser arrangement for brightfield illumination and/or darkfield illumination in optical microscopes which overcomes the disadvantages of the prior art to a great extent and which makes it possible to illuminate object fields of various sizes in brightfield and/or darkfield, with and without immersion, in an optimal manner (uniformly, with low stray light, and in a rotationally symmetric manner) with good reproducibility, high-quality illumination conditions, high performance, and so as to be independent of the aperture to a great extent and which facilitates switching between these types of illumination.

According to the invention, this object is met in a condenser arrangement for brightfield illumination and/or darkfield illumination for optical microscopes comprising a housing, basic optics having at least one lens, at least one front optics which can be introduced into the illumination beam path in front of the basic optics, means for introducing the front optics into the illumination beam path of the microscope and means for introducing cardioid optics with the illumination beam path.

In order to introduce front optics into the beam path, at least one swiveling arm is swivelably arranged at the housing of the condenser. A first swiveling arm carries first front optics with a high aperture for brightfield illumination and a second swiveling arm carries second front optics for darkfield illumination.

It is advantageous when the first swiveling arm and second swiveling arm are arranged at a defined distance from the shared basic optics of the condenser in direction of the optical axis of the illumination beam path.

It is also advantageous that an aperture iris diaphragm is provided on the object side in front of the basic optics and is opened when the cardioid optics are inserted.

Further, it is advantageous when a darkfield slide with an annular mirror element is provided on the object side at the housing.

To facilitate operation of the arrangement, it is advantageous that operator's controls for swiveling the two swiveling arms are provided for moving the darkfield slide and for adjusting the aperture iris diaphragm.

In another advantageous construction, the means for inserting the cardioid optics into the beam path are constructed as swiveling arms, slides or revolving turrets.

Also, it is advantageous when additional optical elements such as DIC prisms, annular diaphragms for realizing phase contrast or central darkfield are provided on the darkfield slide and can be introduced into the beam path when brightfield optics are inserted.

Further, an advantageous construction of the invention consists in that the first front optics are high-aperture optics for brightfield illumination and the second front optics are cardioid optics for darkfield illumination which can be alternately inserted into and removed from the beam path in front of the basic optics particularly with small and medium object fields depending on the type of illumination.

For realizing a darkfield illumination which is symmetric with respect to rotation and for large object fields, it is also advantageous when the annular mirror element is inserted into the illumination beam path with the front optics switched off and the aperture iris diaphragm open.

To ensure reproducible adjustment of the diameter of the aperture iris diaphragm in brightfield when the front optics are reinserted, it is advantageous when the first swiveling arm is connected to the control handle for the aperture iris diaphragm by a first lever mechanism in such a way that the aperture iris diaphragm is adjusted to the previously adjusted diameter when inserting the first front optics into the illumination beam path.

Further, in order to open the darkfield beam path it is advantageous that the second swiveling arm is connected by a second lever mechanism to the control handle for the aperture iris diaphragm in such a way that the aperture iris diaphragm is opened when the second front optics are inserted into the illumination beam path. This second lever mechanism acts on the iris diaphragm.

The condenser arrangement for brightfield illumination and/or darkfield illumination further comprises cardioid optics for realizing darkfield illumination, these optics can be arranged in front of the basic optics for the brightfield illumination and are adapted to the characteristics of the basic optics, and a combined mirror lens system with at least one concave reflecting surface and at least one convex reflecting surface which are arranged on at least one lens. Depending upon the application, additional optics, preferably an auxiliary lens or attachment lens, are provided so as to be insertable into the beam path in front of the cardioid optics on the object side. A preferred construction of these cardioid optics has the following specifications:

| Lens | Radius | Thickness | $n_d$ | $v_d$ | FRD |
|---|---|---|---|---|---|
| $L_1$ | $r_1 = 16.1960$ | 9.380 | 1.784 | 26.10 | 30.000 |
|  | $r_2 = 11.5461$ | 3.680 | 1.607 | 56.65 | 23.092 |
| $L_2$ | $r_3 = 8.0590$ S | 3.680 | 1.607 | 56.65 | 15.720 |
|  | $r_4 = -11.5461$ S | 7.200 | 1.607 | 56.65 |  |
| IM | $r_5 = 11.8839$ | 9.620 | 1.000/1.515 | —/47.75 | 22.000 |
| T |  | 1.100 | 1.522 | 59.48 | 12.000 | where the over-hemispherical, reflecting spherical segment surface on lens $L_2$ is limited by radii $-13.400$ mm and $-6.800$ mm in front of the object-side lens vertex, $n_d$ is the refractive index of the glass, $v_d$ is the Abbe number, FRD is the free diameter, T is the object carrier, S is the reflecting surface, $L_1$ and $L_2$ are lenses, and IM is the immersion medium.

To achieve a changed illumination aperture, it is advantageous when additional optics, preferably in the form of an attachment lens, precede the cardioid optics on the object side and when this construction has the following specifications:

| Lens | Radius | Thickness | $n_d$ | $v_d$ | FRD |
|---|---|---|---|---|---|
| $L_1$ | $r_1 = 16.1960$ | 9.380 | 1.784 | 26.10 | 30.000 |
|  | $r_2 = 11.5461$ | 3.680 | 1.607 | 56.65 | 23.092 |
| $L_2$ | $r_3 = 8.0590$ S | 3.680 | 1.607 | 56.65 | 15.720 |
|  | $r_4 = -11.5461$ S | 7.200 | 1.607 | 56.65 | 22.000 |
| Air | $r_5 = 11.8839$ | 0.00145 | 1.000 | — | 22.000 |
| $L_3$ | $r_6 = 11.884784$ | 8.850 | 1.522 | 59.48 | 22.000 |
| IM |  | 0.465 | 1.515 | 47.75 | 22.000 |
| T |  | 1.100 | 1.522 | 59.48 | 12.000 | where the circular reflecting spherical segment surface on lens $L_2$ is limited by radii $-13.400$ mm and $-6.800$ mm in front of the object-side lens vertex, $n_d$ is the refractive index of the glass, $v_d$ is the Abbe number, FRD is the free diameter, T is the object carrier, S is the reflecting surface, $L_1$ to $L_3$ are lenses, and IM is the immersion medium.

Other advantageous cardioid optics are constructed according to the following specifications:

| Lens | Radius | Thickness | $n_d$ | $v_d$ | FRD |
|---|---|---|---|---|---|
| $L_4$ | $r_7 = 15.6230$ | 2.110 | 1.713 | 53.83 | 30.400 |
|  | $r_8 = 15.9619$ | 5.350 | 1.487 | 70.41 | 29.600 |
| $L_5$ | $r_9 = 10.8200$ S | 5.350 | 1.487 | 70.41 | 21.500 |
|  | $r_{10} = -15.9619$ S | 8.920 | 1.487 | 70.41 |  |
| $L_6$ | $r_{11} = 12.4960$ | 6.460 | 2.022 | 29.06 | 25.600 |
|  | $r_{12} = 8.4140$ | 7.510 |  |  |  |
| IM | $r_{13} = 8.4140$ | 7.000 | 1.515 | 47.75 | 16.400 |
| T |  | 1.100 | 1.515 | 59.48 | 12.000 | where the over-hemispherical reflecting spherical segment surface on lens $L_5$ is limited by radii −19.000 mm and −10.000 mm in front of the object-side lens vertex, $n_d$ is the refractive index of the glass, $v_d$ is the Abbe number, FRD is the free diameter, T is the object carrier, S is the reflecting surface, $L_4$ to $L_6$ are lenses, and IM is the immersion medium.

Further, cardioid optics having the following specifications can be provided:

| Lens | Radius | Thickness | $n_d$ | $v_d$ | FRD |
|---|---|---|---|---|---|
| $L_7$ | $r_{14} = 15.8495$ | 3.0110 | 1.713 | 53.83 | 30.800 |
|  | $r_{15} = 15.8495$ | 5.5280 | 1.487 | 70.41 | 29.200 |
| $L_8$ | $r_{16} = 10.4410$ S | 5.5280 | 1.487 | 70.41 | 20.700 |
|  | $r_{17} = -15.8495$ S | 8.9400 | 1.487 | 70.41 |  |
| $L_9$ | $r_{18} = 12.0575$ | 5.8360 | 2.022 | 29.06 | 24.114 |
|  | $r_{19} = 8.5340$ | 7.8500 |  |  | 16.736 |
| IM | $r_{20} = 8.5340$ | 7.3000 | 1.515 | 47.75 | 16.736 |
| T |  | 1.1000 | 1.522 | 59.48 | 12.000 | where the circular reflecting spherical segment surface with radius $r_{17}$ on lens $L_8$ is limited by radii −19.000 mm and −10.000 mm in front of the object-side lens vertex, $n_d$ is the refractive index of the glass, $v_d$ is the Abbe number, FRD is the free diameter, T is the object carrier, S is the reflecting surface, $L_7$ to $L_9$ are lenses, and IM is the immersion medium.

The invention offers the considerable advantage that the cardioid optics according to the invention can be applied with or without an immersion medium. Accordingly, special optics are no longer needed for either application. Due to the fact that in cardioid systems the internal mirror, in a very practical manner, simultaneously causes the shading of the low-aperture light beams and can be located very close to the object, the false light caused by residual aberrations can be kept to a minimum. At the same time, the shading internal mirror also blocks all stray light and reflected light from the optics located below them so that the darkfield contrast is more brilliant. With centrally arranged darkfield diaphragms, this light is removed by appropriately overdimensioned diaphragms in the pupil so that the light used for darkfield illumination is further reduced. The cardioid optics can provide more light for darkfield illumination compared to the central diaphragm.

In the following, the invention will be described more fully with reference to embodiment examples.

BRIEF DESCRIPTION OF THE DRAWINGS

In the drawngs:

FIGS. 1e and 1f show the basic optics of the condenser arrangement in two cross-sectional views;

FIG. 2b is a bottom view of the condenser arrangement according to FIG. 2a;

FIG. 3 is a bottom view of the condenser arrangement according to FIG. 1a;

DESCRIPTION OF THE PREFERRED EMBODIMENTS

Figure 1A:
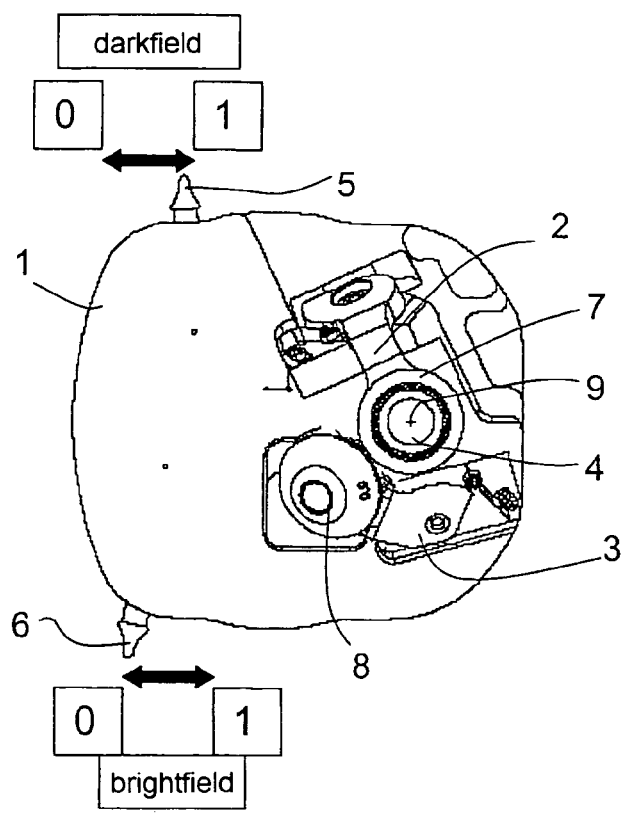
FIG. 1a shows a condenser arrangement with adjusted darkfield illumination.

FIG. 1a shows a top view of a condenser arrangement for brightfield illumination and/or darkfield illumination for microscopes with a condenser housing 1. A plurality of swivelable swiveling arms 2 and 3 are arranged on the outer side of the condenser housing 1. These swiveling arms 2 and 3 are provided for receiving optical components such as high-aperture front optics for brightfield illumination or cardioid optics for darkfield illumination. The above-mentioned optical components can be swiveled into the illumination beam path, as needed, in such a way that they are positioned in the illumination beam path at an exactly defined distance from shared basic optics (not shown) which are arranged in the condenser housing. An opening 4 is provided in the housing 1 for the illumination beam path. The operator's controls 5 and 6 are connected to the swiveling arms 2, 3 by a lever mechanism (not shown in FIG. 1a) by which the optical components arranged at the swiveling arms 2 and 3 can be inserted into the respective illumination beam path.

The condenser arrangement according to FIG. 1a is provided for darkfield illumination. The corresponding front optics 7 for darkfield illumination which are arranged at the swivelable swiveling arm 2 are swiveled into the illumination beam path in front of the basic optics. In FIG. 1a, this situation is illustrated by position '1' of an operator's control 5. Front optics 8 which are arranged at swiveling arm 3 and which are provided for brightfield illumination are located outside the illumination beam path. In this case, an operator's control 6 is in position '0' for brightfield illumination.

Figure 1B:
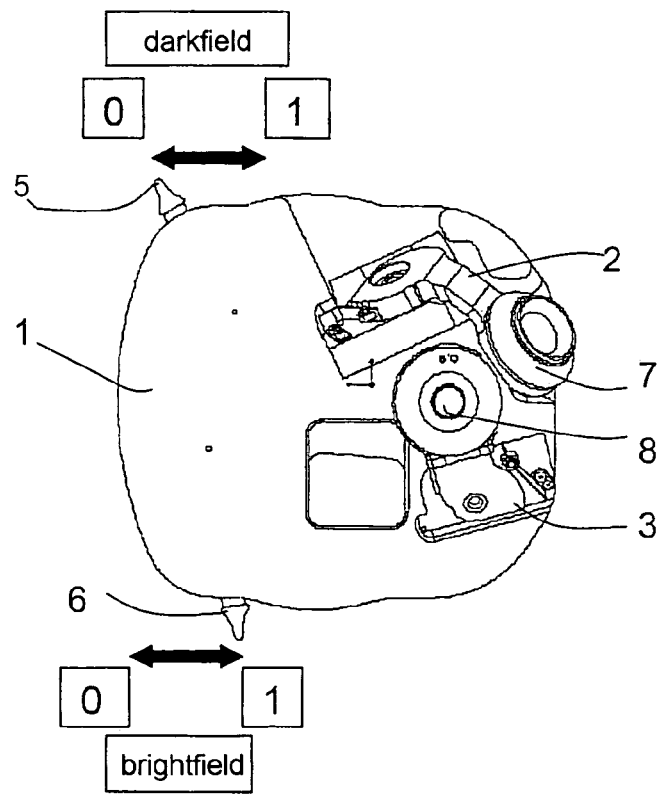
FIG. 1b shows the condenser arrangement with adjusted brightfield illumination.

FIG. 1b shows a top view of the condenser arrangement according to the invention as used for brightfield illumination. For this purpose, the corresponding front optics 8 which are arranged at swiveling arm 3 are arranged in the illumination beam path in front of the basic optics (not shown). The front optics 7 for darkfield illumination which are located at swiveling arm 2 are outside the illumination beam path. The operator's control 5 is in position 0 for darkfield illumination and operator's control 6 is in position 1 for brightfield illumination.

Figure 1C:
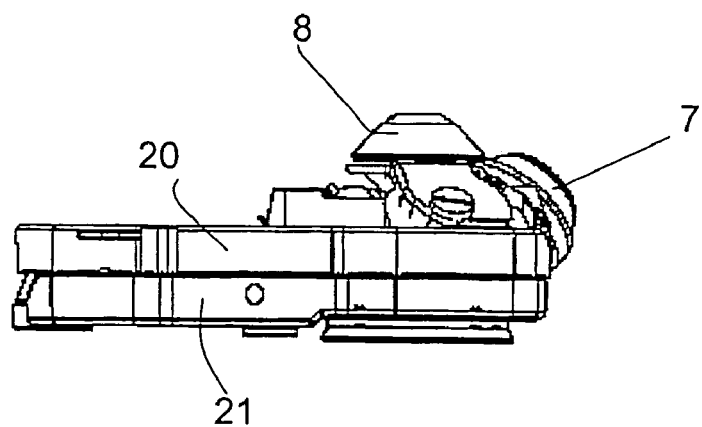
FIG. 1c is a side view showing the condenser arrangement according to FIG. 1b.

FIG. 1c shows a side view of the condenser arrangement according to FIG. 1b. It has an upper shell 20 with the swiveling arms 5 and 6 swivelably mounted thereon, the front optics 7 and 8 being arranged at the swiveling arms 5 and 6, and a bottom shell 21 in which transmission and lever mechanisms, gear unit members and the aperture iris diaphragm 10 (not shown in FIG. 1c) are arranged.

Figure 1D:
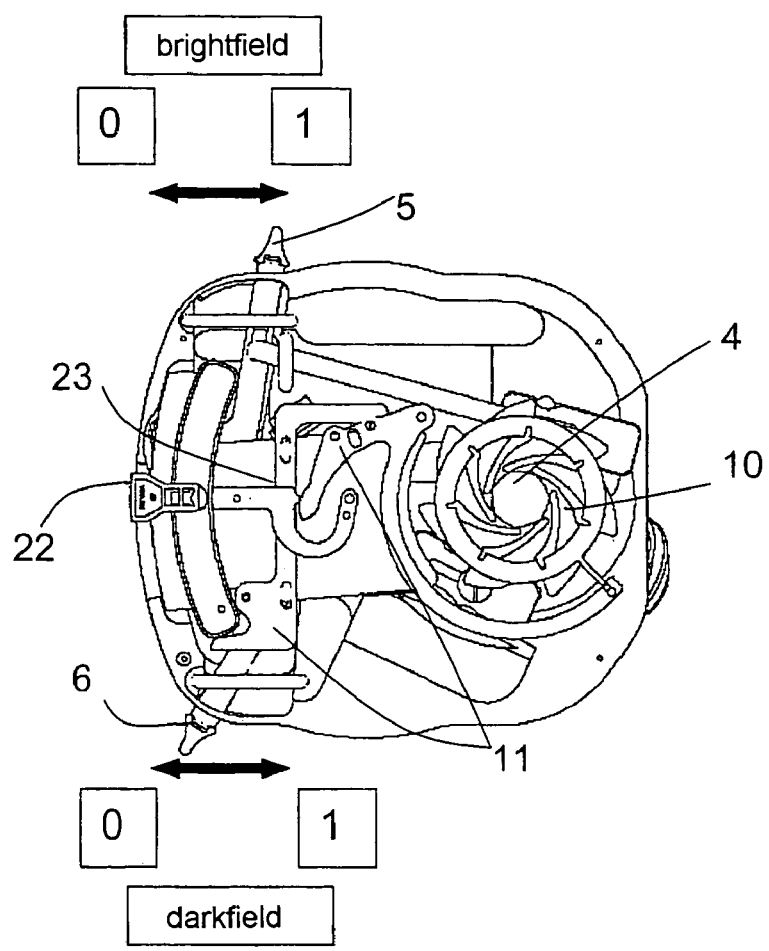
FIG. 1d is a bottom view of the condenser arrangement according to FIG. 1c.

FIG. 1d shows a bottom view of the condenser arrangement according to FIG. 1c. The bottom shell 21 is removed and the front optics 8 for brightfield illumination are swiveled into the beam path. The operator's control 5 is in position 1 for brightfield and operator's control 6 is in position 0 for darkfield. In the brightfield illumination setting, the aperture iris diaphragm 10 can be adjusted to any diameter within an adjustment range from the outside with a handle 22 by means of a lever mechanism 23 which is arranged in the bottom shell 21.

FIGS. 1e and 1f show the basic optics 15 of the condenser arrangement in two views.

Figure 2A:
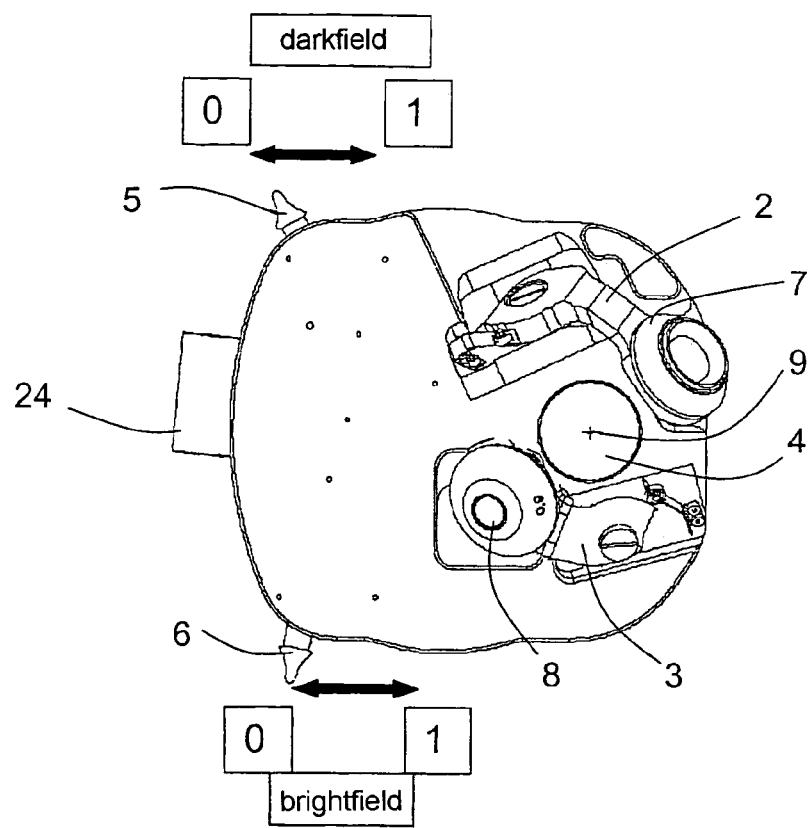
FIG. 2a is a top view of a condenser arrangement with the front optics swiveled out.

FIG. 2a is a top view of the condenser arrangement in a setting in which the front optics 7 for darkfield illumination and the front optics 8 for brightfield illumination are swiveled out of the optical axis 9 of the illumination beam path of the microscope with the associated swiveling arms 2, 3. Both operator's controls 5 and 6 are in position 0.

Figure 2B:
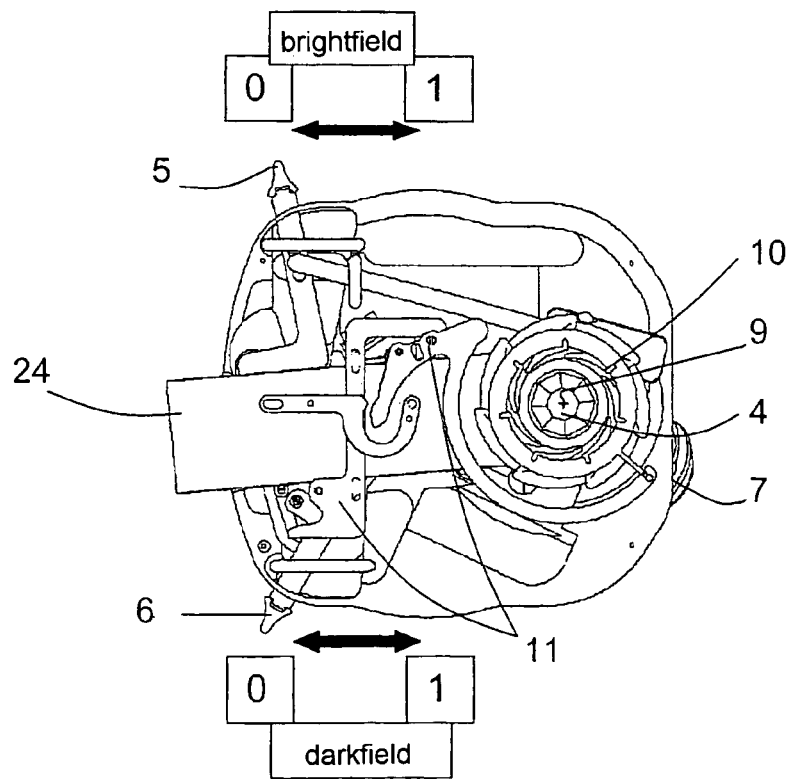

FIG. 2b shows a bottom view of the condenser arrangement in which the bottom shell 21 has been removed and the two front optics 7 and 8 are taken out of the beam path. As is shown in FIG. 2b, a darkfield slide 24 which can be slid into the arrangement is provided. An annular mirror element can be introduced into the beam path by this darkfield slide 24 in order to achieve a rotationally symmetric darkfield illumination in large object fields with objectives having 2.5× to 5× magnification. This darkfield slide 24 is inserted into the beam path above the basic optics when the front optics 7 and 8 are taken out and is connected to the aperture iris diaphragm 10 by a transmission mechanism 11. Further, the aperture iris diaphragm 10 is opened to its maximum diameter when the darkfield slide 24 is slid in. When the slide 24 is taken out, the aperture iris diaphragm 10 jumps back to the previously adjusted diameter. The swiveling arms 2 and 3 remain swiveled out of the beam path along with the front optics 7 and 8.

Figure 3:
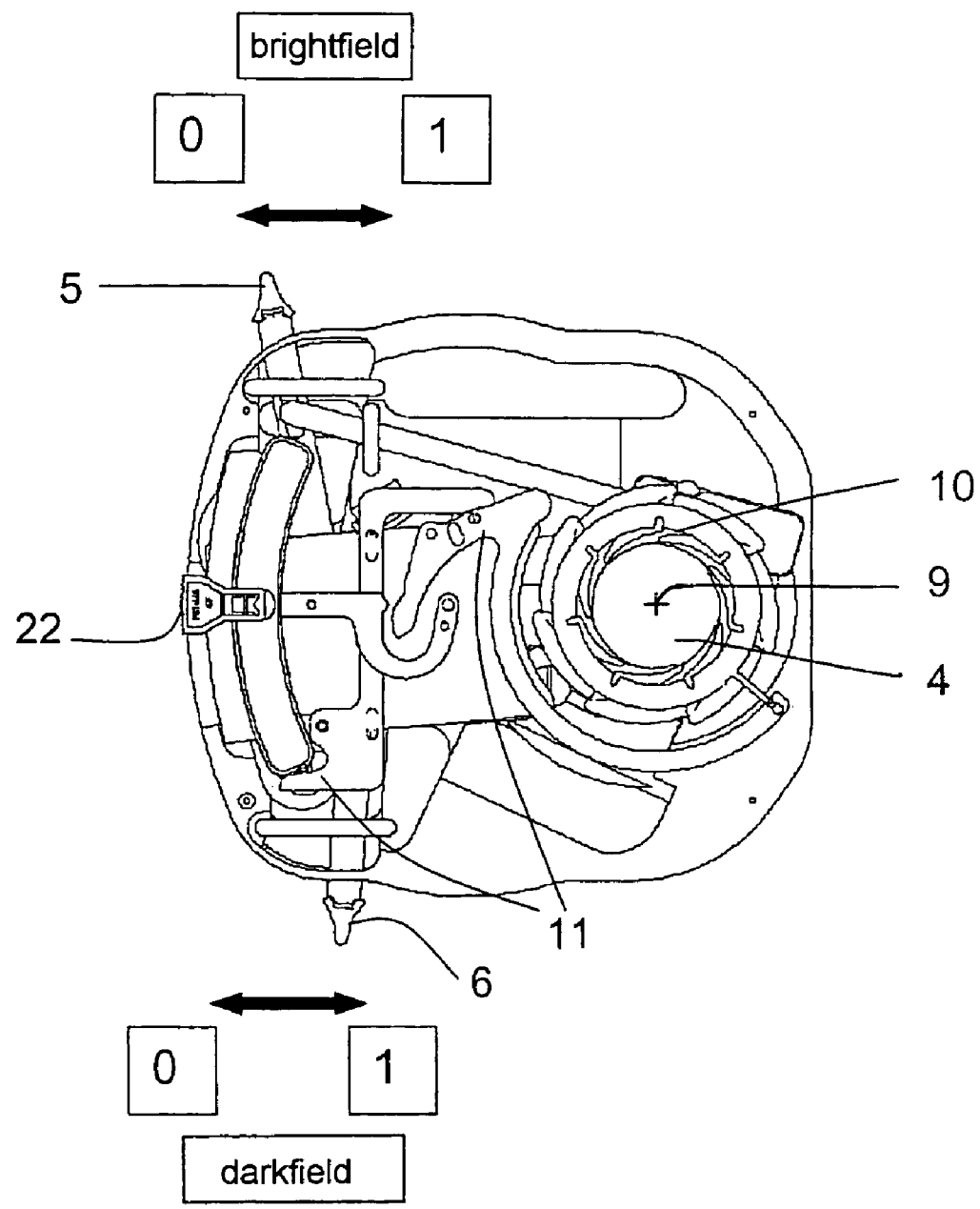

FIG. 3 shows a bottom view of the condenser arrangement according to FIG. 1a with the bottom shell 21 removed and in the darkfield illumination setting. The front optics 7 at the swiveling arm 2 (not visible in FIG. 3) are in the illumination beam path. The front optics 8 (also not visible in FIG. 3) for brightfield illumination which are arranged at swiveling arm 3 are taken out of the illumination beam path. When the front optics 7 for darkfield illumination are in the beam path, the aperture iris diaphragm 10 is adjusted to its maximum diameter (opening) by means of the transmission mechanism 11. The handle 22 remains in the position to which it was adjusted for brightfield illumination. When switching to brightfield illumination, the aperture iris diaphragm 10 jumps back to its previously adjusted diameter.

Regulation of the aperture iris diaphragm 10 is always initiated by one of the two operator's controls 5, 6. The latter move in opposite directions for alternate insertion and in the same direction when swiveling out the swiveling arms 2, 3 with the optics arranged thereon.

Figure 4:
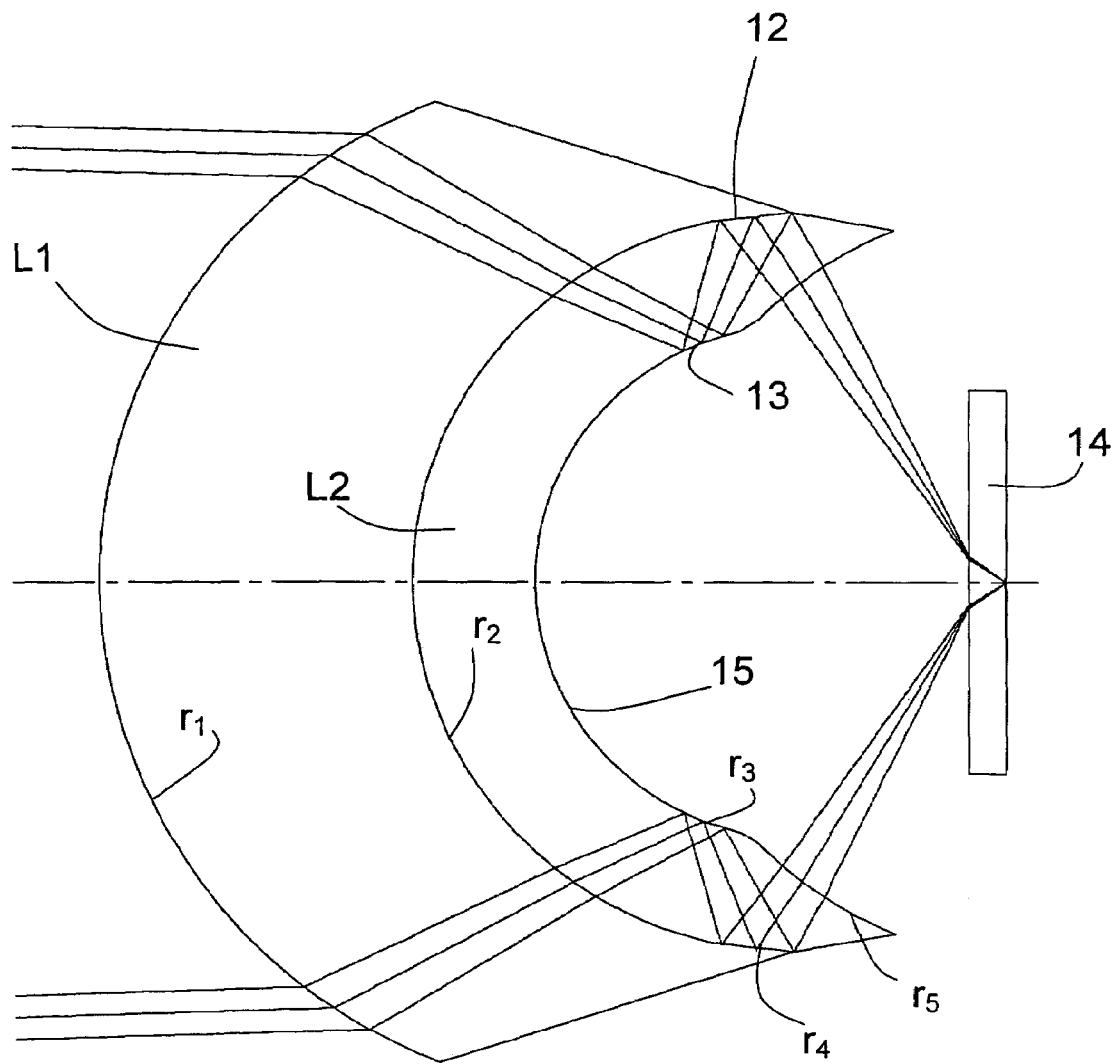
FIG. 4 shows a meridional lens section of cardioid optics comprising two lenses, without immersion.

FIG. 4 shows a meridional lens section of cardioid optics, without immersion, for realizing a darkfield illumination. The cardioid optics precede the basic optics (not shown in the drawings) on the object side and are adapted to the characteristics of the associated basic optics. These cardioid optics comprise a lens system having lenses $L_1$ and $L_2$. Lens $L_2$ has on one portion of its two surfaces at least one concave reflecting surface 12 and at least one convex reflecting surface 13. The reflecting surface 13 is arranged on the surface of the lens $L_2$ facing the object carrier 14. These cardioid optics have the following specifications:

| Lens | Radius | Thickness | $n_d$ | $v_d$ | FRD |
|---|---|---|---|---|---|
| $L_1$ | $r_1 = 16.1960$ | 9.380 | 1.784 | 26.10 | 30.000 |
|  | $r_2 = 11.5461$ | 3.680 | 1.607 | 56.65 | 23.092 |
| $L_2$ | $r_3 = 8.0590$ S | 3.680 | 1.607 | 56.65 | 15.720 |
|  | $r_4 = 11.5461$ S | 7.200 | 1.607 | 56.65 |  |
| IM | $r_5 = 11.8839$ | 9.620 | 1.000/1.515 | —/47.75 | 22.000 |
| T |  | 1.100 | 1.522 | 59.48 | 12.000 | where the over-hemispherical reflecting spherical segment surface on lens $L_2$ is limited by radii −13.400 mm and −6.800 mm in front of the object-side lens vertex, $n_d$ is the refractive index of the glass, $v_d$ is the Abbe number, FRD is the free diameter, T is the object carrier 14, S is the reflecting surface, $L_1$ and $L_2$ are lenses, and IM is the immersion medium.

Figure 5:
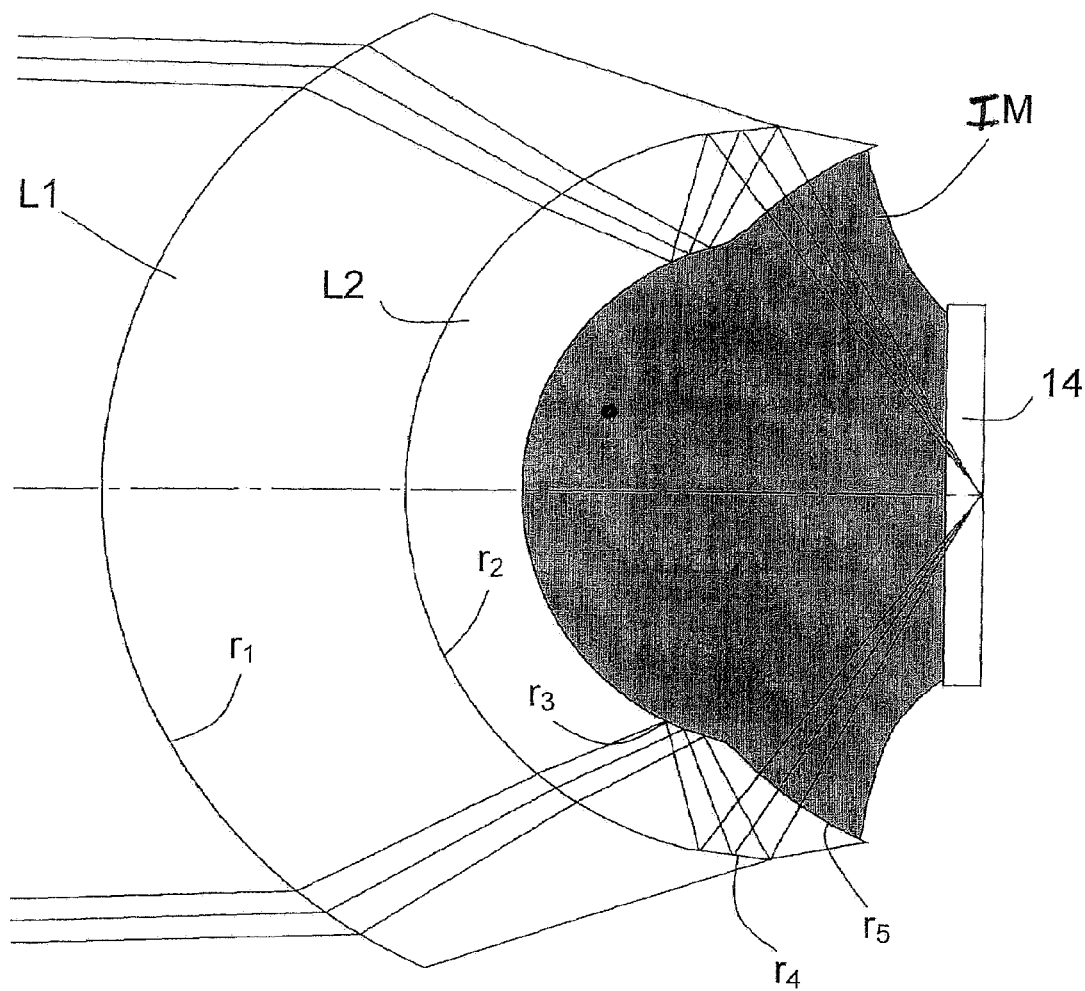
FIG. 5 shows a meridional lens section of the cardioid optics comprising two lenses, with immersion.

FIG. 5 shows the same cardioid optics as in FIG. 4. An immersion medium IM, known per, is introduced in the space between the surface of the lens $L_2$ facing the object carrier 14 and the object carrier 14. The corresponding specifications of this system are contained in the preceding table.

Figure 6:
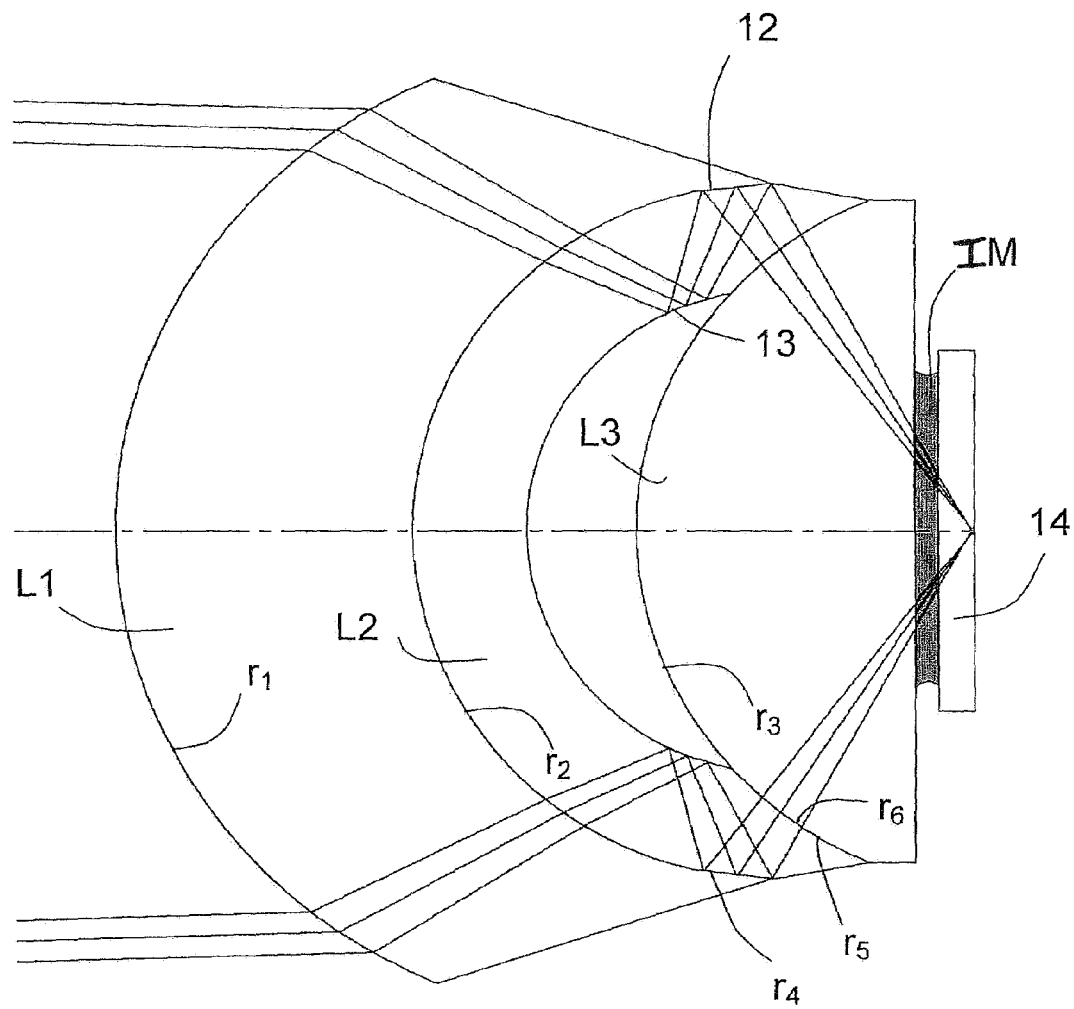
FIG. 6 shows a meridional lens section of cardioid optics comprising two lenses, with attachment lens.

FIG. 6 shows a meridional lens section of the cardioid optics comprising lenses $L_1$ and $L_2$. An auxiliary lens or attachment lens $L_3$ is mounted in front of the lens $L_2$ adjacent to the object carrier. A thin air gap is provided with edge contact of the lenses in the space between the attachment lens $L_3$ and the object carrier 14.

The corresponding specifications are given in the following table:

| Lens | Radius | Thickness | $n_d$ | $v_d$ | FRD |
|---|---|---|---|---|---|
| $L_1$ | $r_1 = 16.1960$ | 9.380 | 1.784 | 26.10 | 30.000 |
|  | $r_2 = 11.5461$ | 3.680 | 1.607 | 56.65 | 23.092 |
| $L_2$ | $r_3 = 8.0590$ S | 3.680 | 1.607 | 56.65 | 15.720 |
|  | $r_4 = -11.5461$ S | 7.200 | 1.607 | 56.65 | 22.000 |
| Air | $r_5 = 11.8839$ | 0.00145 | 1.000 | — | 22.000 |
| $L_3$ | $r_6 = 11.884784$ | 8.850 | 1.522 | 59.48 | 22.000 |
| IM |  | 0.465 | 1.515 | 47.75 | 22.000 |
| T |  | 1.100 | 1.522 | 59.48 | 12.000 |

The over-hemispherical, reflecting spherical segment surface on lens $L_2$ is limited by radii −13.400 mm and −6.800 mm in front of the object-side lens vertex, $n_d$ is the refractive index of the glass, $v_d$ is the Abbe number, FRD is the free diameter, T is the object carrier 14, S is the reflecting surface, $L_1$ to $L_3$ are lenses, and IM is the immersion medium.

Figure 7:
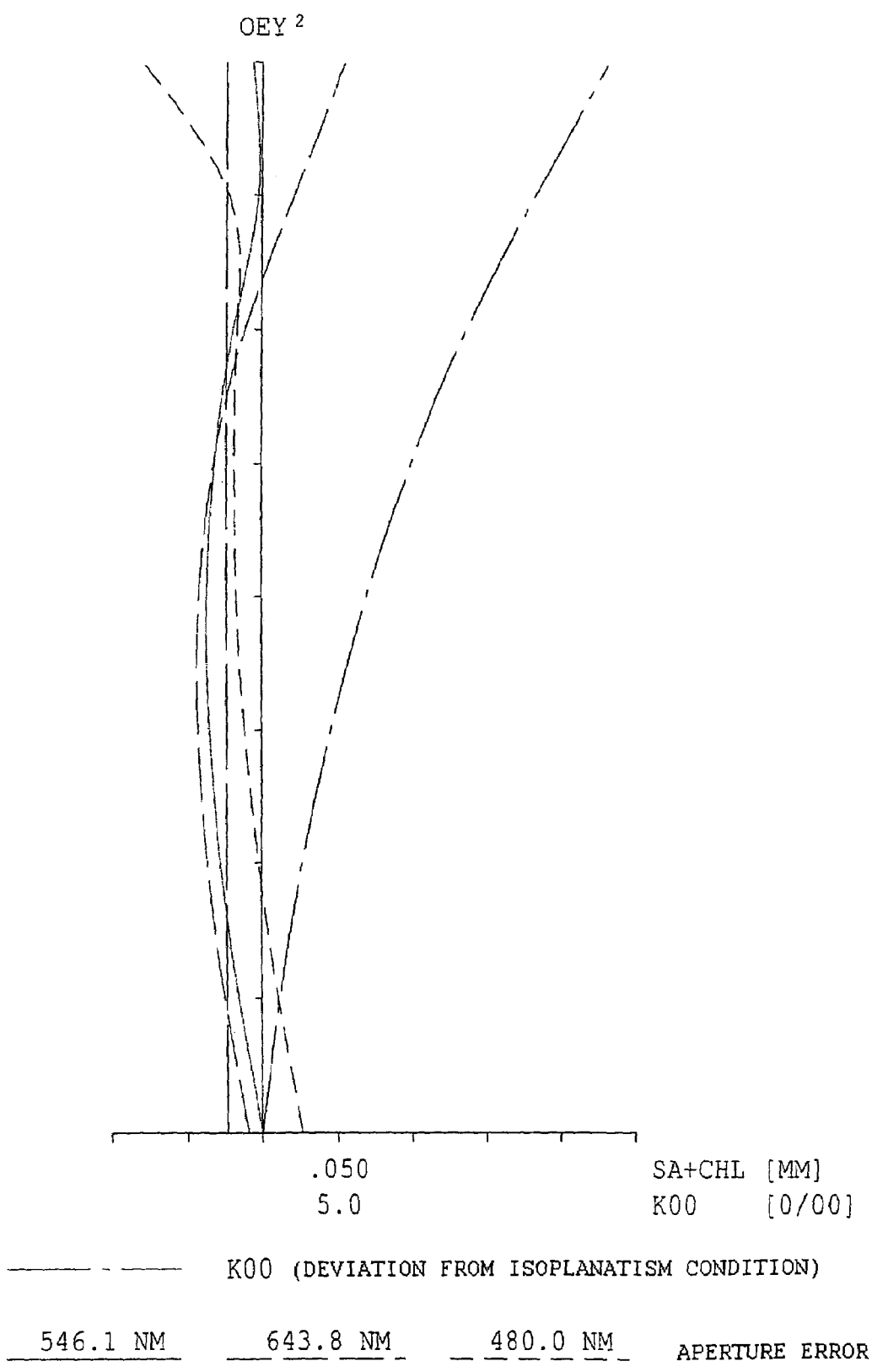
FIG. 7 shows the imaging errors of the lens section according to FIG. 4.

FIG. 7 shows imaging errors (spherical aberration) of the cardioid optics according to FIG. 4. The deviation from the isoplanatism condition and the aperture aberration at wavelengths 546.1 nm and 480.0 nm are also shown.

Figure 8:
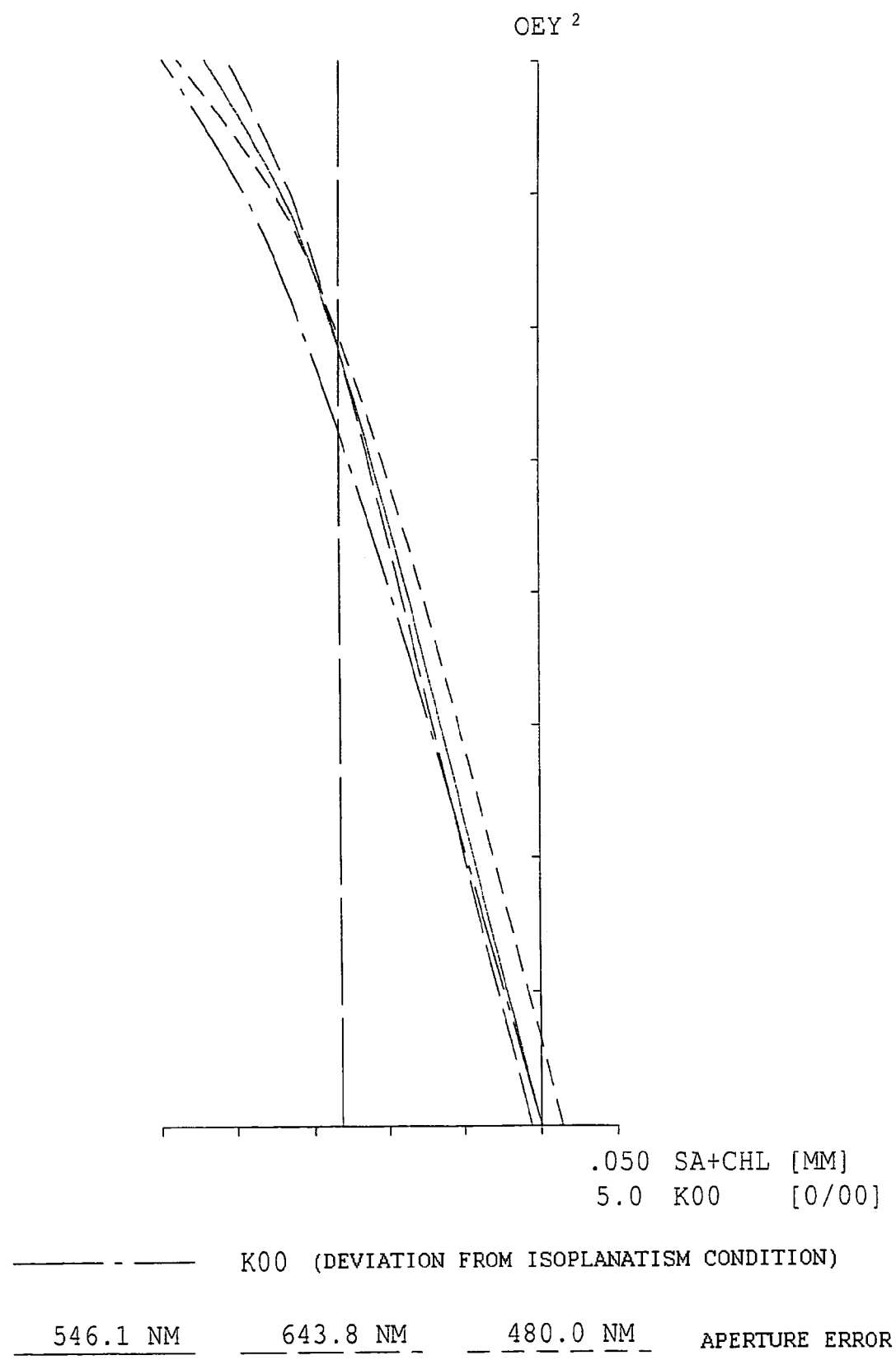
FIG. 8 shows the imaging errors of the lens section according to FIG. 6.

FIG. 8 is a graph showing the spherical aberration as a function of the aperture of the cardioid optics shown in FIG. 6 with attachment lens $L_3$ and immersion medium IM. Again, the deviation from the isoplanatism condition and the aperture aberration at wavelengths 546.1 nm, 643.8 nm and 480.0 nm are also shown.

Figure 9:
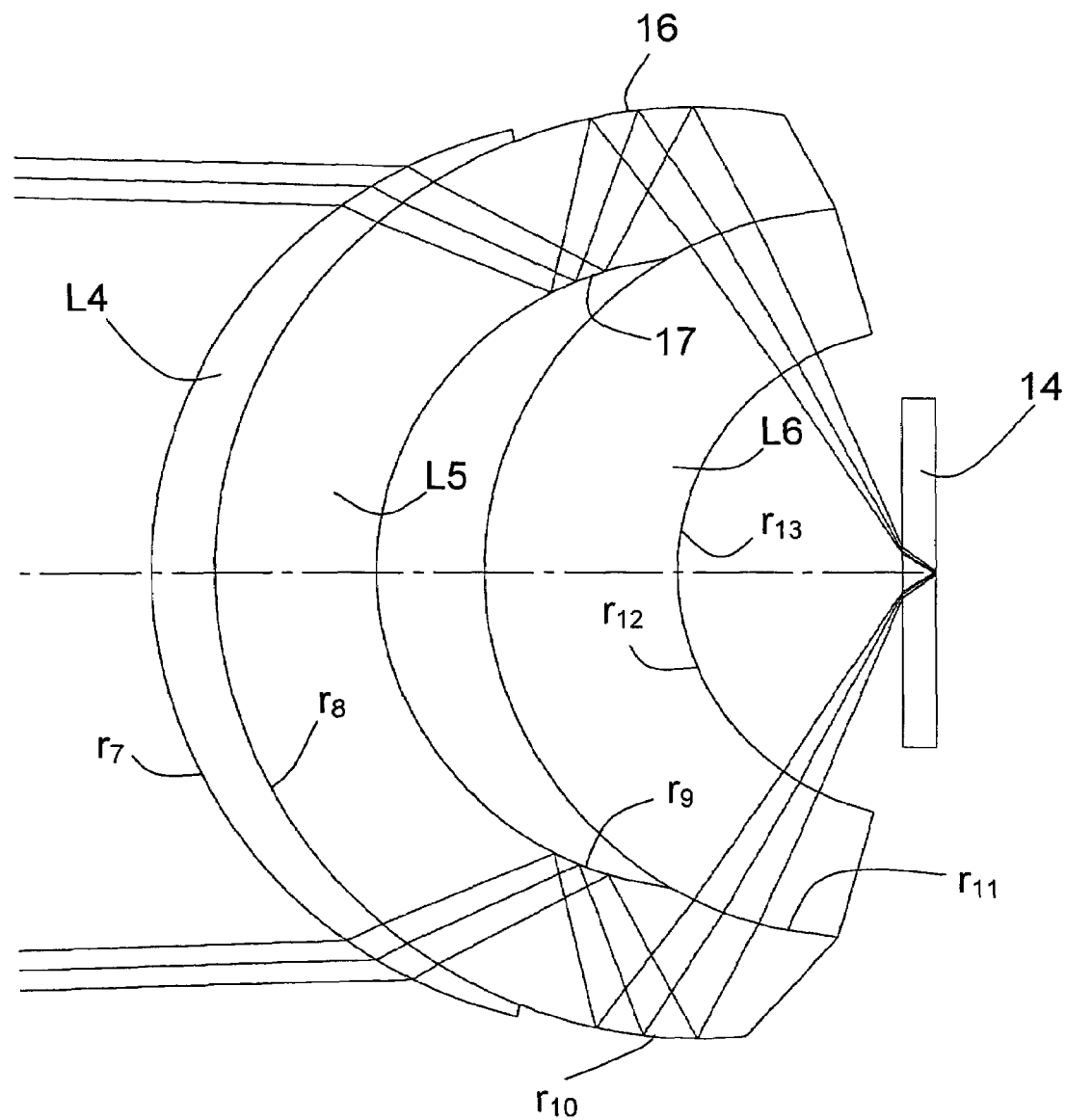
FIG. 9 shows a meridional lens section of cardioid optics comprising three lenses, without immersion.

A meridional lens section of cardioid optics comprising three lenses $L_4$, $L_5$ and $L_6$ using immersion is shown in FIG. 9. In this arrangement, lens $L_5$ has a reflecting concave surface 16 on one of its surfaces and a reflecting convex surface 17 on the other surface which is adjacent to the object carrier. The specifications for these cardioid optics are listed in the following table:

| Lens | Radius | Thickness | $n_d$ | $v_d$ | FRD |
|---|---|---|---|---|---|
| $L_4$ | $r_7$ = 15.6230 | 2.110 | 1.713 | 53.83 | 30.400 |
|  | $r_8$ = 15.9619 | 5.350 | 1.487 | 70.41 | 29.600 |
| $L_5$ | $r_9$ = 10.8200 S | 5.350 | 1.487 | 70.41 | 21.500 |
|  | $r_{10}$ = −15.9619 S | 8.920 | 1.487 | 70.41 |  |
| $L_6$ | $r_{11}$ = 12.4960 | 6.460 | 2.022 | 29.06 | 25.600 |
|  | $r_{12}$ = 8.4140 | 7.510 |  |  |  |
| IM | $r_{13}$ = 8.4140 | 7.000 | 1.515 | 47.75 | 16.400 |
| T |  | 1.100 | 1.515 | 59.48 | 12.000 |

The over-hemispherical reflecting spherical segment surface with radius $r_{10}$ on lens $L_5$ is limited by radii −19.000 mm and −10.000 mm. $n_d$ is the refractive index of the glass, $v_d$ is the Abbe number, FRD is the free diameter, T is the object carrier, S is the reflecting surface, $L_4$ to $L_6$ are lenses, and IM is the immersion medium.

Figure 10:
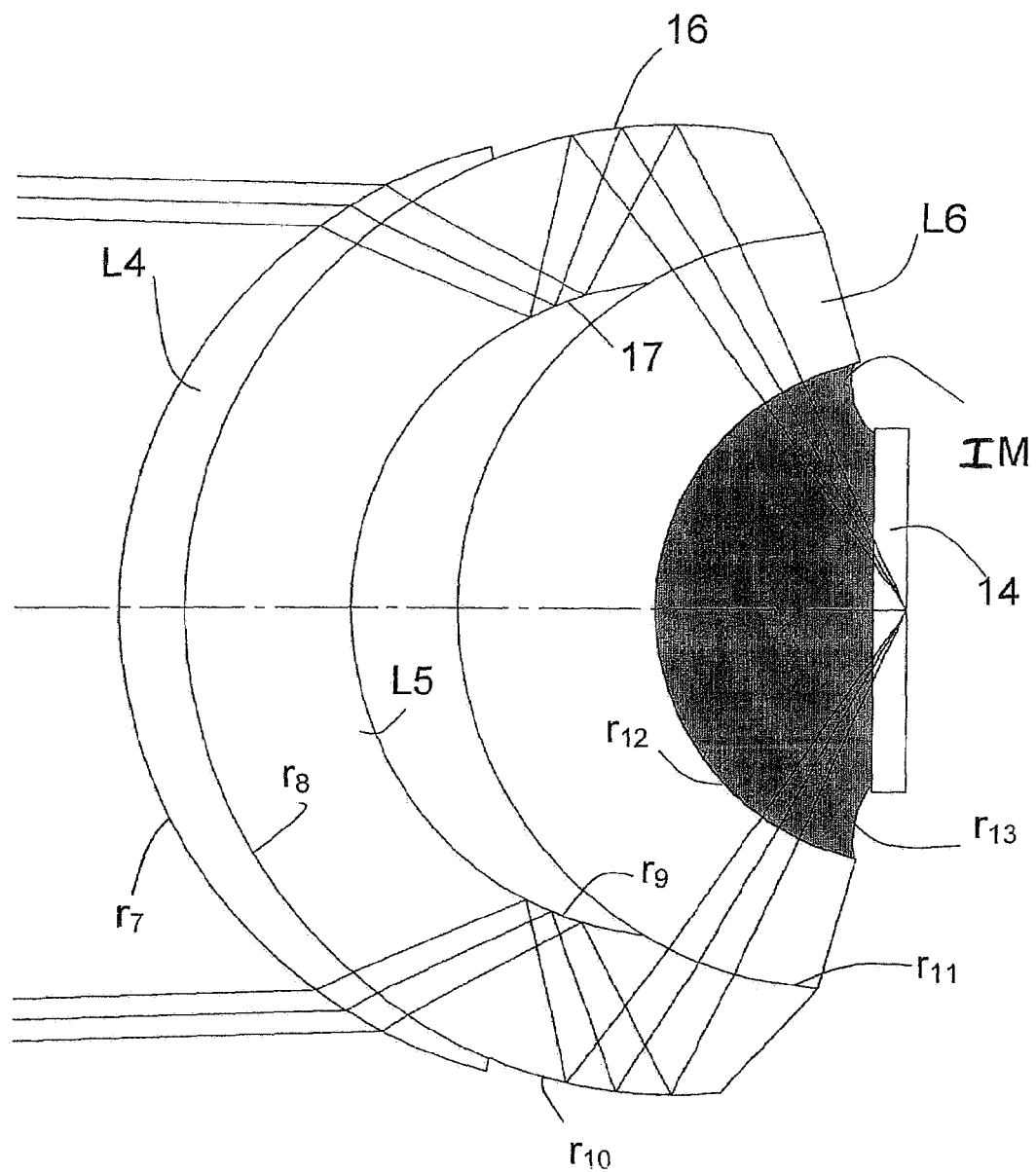
FIG. 10 shows a meridional lens section of the cardioid optics comprising three lenses, with immersion.

FIG. 10 shows the cardioid optics according to FIG. 9. An immersion medium IM is provided between lens $L_6$ and the object carrier 14.

Figure 11:
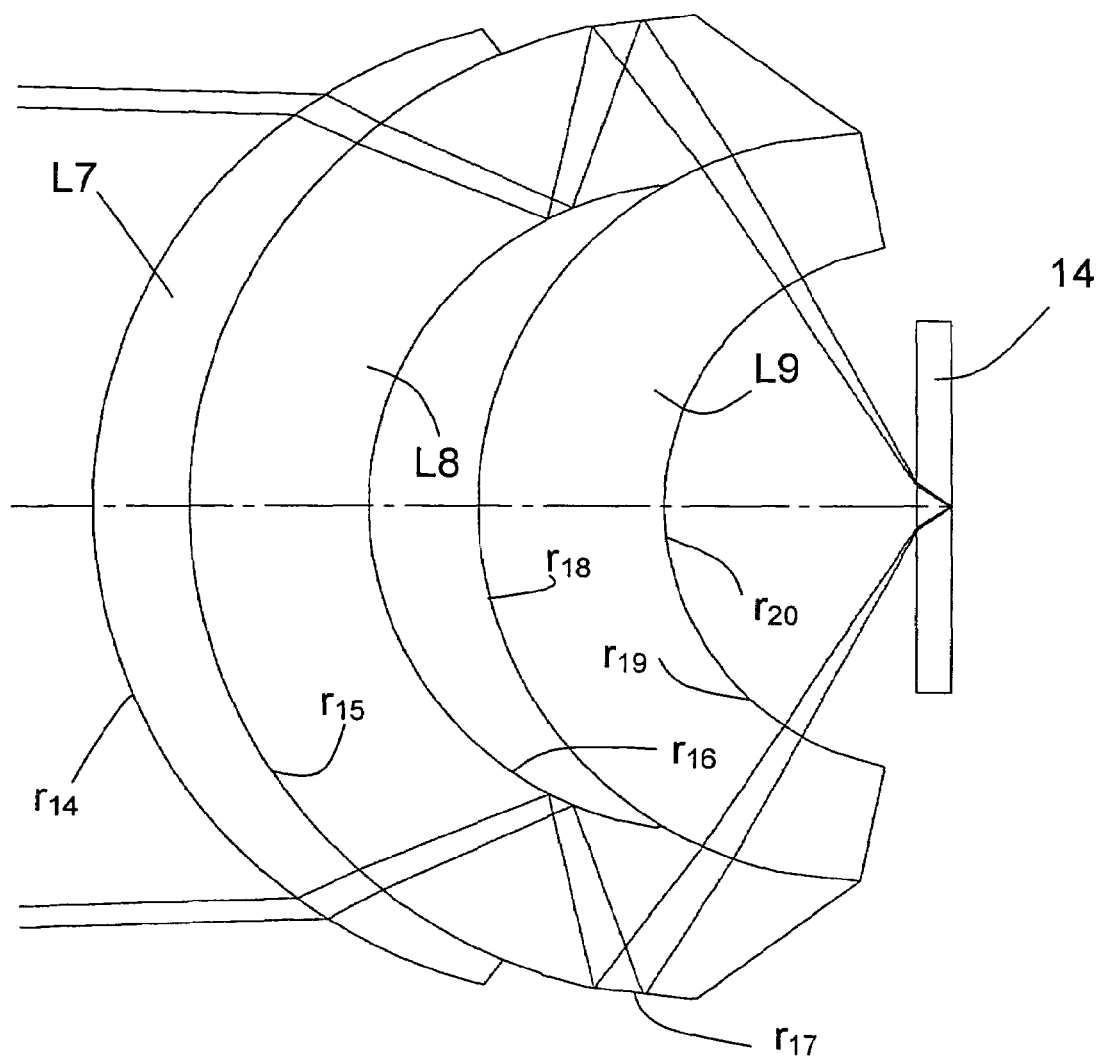
FIG. 11 shows a meridional lens section of other cardioid optics comprising three lenses, without immersion.

A meridional lens section of cardioid optics comprising three lenses $L_7$, $L_8$ and $L_9$ is shown in FIG. 11, without immersion medium. In this construction, lens $L_8$ has a concave reflecting surface 18 on one surface and a convex reflecting surface 19 on its opposite surface. The corresponding specifications of this arrangement are shown in the following table:

| Lens | Radius | Thickness | $n_d$ | $v_d$ | FRD |
|---|---|---|---|---|---|
| $L_7$ | $r_{14}$ = 15.8495 | 3.0110 | 1.713 | 53.83 | 30.800 |
|  | $r_{15}$ = 15.8495 | 5.5280 | 1.487 | 70.41 | 29.200 |
| $L_8$ | $r_{16}$ = 10.4410 S | 5.5280 | 1.487 | 70.41 | 20.700 |
|  | $r_{17}$ = −15.8495 S | 8.9400 | 1.487 | 70.41 |  |
| $L_9$ | $r_{18}$ = 12.0575 | 5.8360 | 2.022 | 29.06 | 24.114 |
|  | $r_{19}$ = 8.5340 | 7.8500 |  |  | 16.736 |
| IM | $r_{20}$ = 8.5340 | 7.3000 | 1.515 | 47.75 | 16.736 |
| T |  | 1.1000 | 1.522 | 59.48 | 12.000 | where the over-hemispherical reflecting spherical segment surface with radius $r_{17}$ on lens $L_8$ is limited by radii −19.000 mm and −10.000 mm in front of the object-side lens vertex, $n_d$ is the refractive index of the glass, $v_d$ is the abbe number, FRD is the free diameter, T is the object carrier, S is the reflecting surface, $L_7$ to $L_9$ are lenses, and IM is the immersion medium.

While the foregoing description and drawings represent the present invention, it will be obvious to those skilled in the art that various changes may be made therein without departing from the true spirit and scope of the present invention.

REFERENCE NUMBERS 1 housing
2, 3 swiveling arm
4 opening
5, 6 operator's control
7 front optics (darkfield)
8 front optics (brightfield)
9 optical axis
10 aperture iris diaphragm
11 transmission mechanism
12, 13 reflecting surface
14 object carrier
16, 17 surface
18, 19 reflecting surface
20 upper shell
21 bottom shell
22 handle
23 lever mechanism
12 darkfield slide

What is claimed is:

1. Cardioid optics for darkfield illumination for microscopes, which cardioid optics can be arranged in front of the basic optics for the brightfield illumination and are adapted to the characteristics of the basic optics and comprise a combined mirror lens system with at least one concave reflecting surface and at least one convex reflecting surface which are arranged on at least one lens, and additional optics, in the form of an attachment lens ($L_3$), which can be inserted into the beam path in front of the mirror lens system on the object side as required, having the following specifications:

| Lens | Radius | Thickness | $n_d$ | $v_d$ | FRD |
|---|---|---|---|---|---|
| $L_1$ | $r_1$ = 16.1960 | 9.380 | 1.784 | 26.10 | 30.000 |
|  | $r_2$ = 11.5461 | 3.680 | 1.607 | 56.65 | 23.092 |
| $L_2$ | $r_3$ = 8.0590 S | 3.680 | 1.607 | 56.65 | 15.720 |
|  | $r_4$ = −11.5461 S | 7.200 | 1.607 | 56.65 |  |
| IM | $r_5$ = 11.8839 | 9.620 | 1.000/1.515 | —/47.75 | 22.000 |
| T |  | 1.100 | 1.522 | 59.48 | 12.000 | where the over-hemispherical reflecting spherical segment surface on lens $L_2$ is limited by radii −13.400 mm and −6.800 mm in front of the object-side lens vertex, $n_d$ is the refractive index of the glass, $v_d$ is the Abbe number, FRD is the free diameter, T is the object carrier, S is the reflecting surface, $L_1$ and $L_2$ are lenses, and IM is the immersion medium.

2. Cardioid optics for darkfield illumination for microscopes, which cardioid optics can be arranged in front of the basic optics for the brightfield illumination and are adapted to the characteristics of the basic optics and comprise a combined mirror lens system with at least one concave reflecting surface and at least one convex reflecting surface which are arranged on at least one lens, and additional optics, in the form of an attachment lens ($L_3$), which can be inserted into the beam path in front of the mirror lens system on the object side as required, having additional optics arranged in front on the object side and by the following specifications:

| Lens | Radius | Thickness | $n_d$ | $v_d$ | FRD |
|---|---|---|---|---|---|
| $L_1$ | $r_1$ = 16.1960 | 9.380 | 1.784 | 26.10 | 30.000 |
|  | $r_2$ = 11.5461 | 3.680 | 1.607 | 56.65 | 23.092 |

-continued

| Lens | Radius | Thickness | $n_d$ | $v_d$ | FRD |
|---|---|---|---|---|---|
| $L_2$ | $r_3 = 8.0590$ S | 3.680 | 1.607 | 56.65 | 15.720 |
|  | $r_4 = -11.5461$ S | 7.200 | 1.607 | 56.65 | 22.000 |
| Air | $r_5 = 11.8839$ | 0.00145 | 1.000 | — | 22.000 |
| $L_3$ | $r_6 = 11.884784$ | 8.850 | 1.522 | 59.48 | 22.000 |
| IM |  | 0.465 | 1.515 | 47.75 | 22.000 |
| T |  | 1.100 | 1.522 | 59.48 | 12.000 | where the over-hemispherical reflecting spherical segment surface on lens $L_2$ s limited by radii −13.400 mm and −6.800 mm in front of the object-side lens vertex, $n_d$ is the refractive index of the glass, $v_d$ is the Abbe number, FRD is the free diameter, T is the object carrier, S is the reflecting surface, $L_1$ to $L_3$ are lenses, and IM is the immersion medium.

3. Cardioid optics for darkfield illumination for microscopes, which cardioid optics can be arranged in front of the basic optics for the brightfield illumination and are adapted to the characteristics of the basic optics and comprise a combined mirror lens system with at least one concave reflecting surface and at least one convex reflecting surface which are arranged on at least one lens, and additional optics, in the form of an attachment lens ($L_3$), which can be inserted into the beam path in front of the mirror lens system on the object side as required, and wherein the additional optics are constructed as an auxiliary lens or attachment lens ($L_3$).

4. Cardioid optics for darkfield illumination for microscopes, which cardioid optics can be arranged in front of the basic optics for the brightfield illumination and are adapted to the characteristics of the basic optics and comprise a combined mirror lens system with at least one concave reflecting surface and at least one convex reflecting surface which are arranged on at least one lens, and additional optics, in the form of an attachment lens ($L_3$), which can be inserted into the beam path in front of the mirror lens system on the object side as required, having the following specifications:

| Lens | Radius | Thickness | $n_d$ | $v_d$ | FRD |
|---|---|---|---|---|---|
| $L_4$ | $r_7 = 15.6230$ | 2.110 | 1.713 | 53.83 | 30.400 |
|  | $r_8 = 15.9619$ | 5.350 | 1.487 | 70.41 | 29.600 |
| $L_5$ | $r_9 = 10.8200$ S | 5.350 | 1.487 | 70.41 | 21.500 |
|  | $r_{10} = -15.9619$ S | 8.920 | 1.487 | 70.41 |  |

-continued

| Lens | Radius | Thickness | $n_d$ | $v_d$ | FRD |
|---|---|---|---|---|---|
| $L_6$ | $r_{11} = 12.4960$ | 6.460 | 2.022 | 29.06 | 25.600 |
|  | $r_{12} = 8.4140$ | 7.510 |  |  |  |
| IM | $r_{13} = 8.4140$ | 7.000 | 1.515 | 47.75 | 16.400 |
| T |  | 1.100 | 1.515 | 59.48 | 12.000 | where the over-hemispherical reflecting spherical segment surface with radius $r_{10}$ on lens $L_5$ is limited by radii −19.000 mm and −10.000 mm in front of the object-side lens vertex, $n_d$ is the refractive index of the glass, $v_d$ is the Abbe number, FRD is the free diameter, T is the object carrier, S is the reflecting surface, $L_4$ to $L_6$ are lenses, and IM is the immersion medium.

5. Cardioid optics for darkfield illumination for microscopes, which cardioid optics can be arranged in front of the basic optics for the brightfield illumination and are adapted to the characteristics of the basic optics and comprise a combined mirror lens system with at least one concave reflecting surface and at least one convex reflecting surface which are arranged on at least one lens, and additional optics, in the form of an attachment lens ($L_3$), which can be inserted into the beam path in front of the mirror lens system on the object side as required, having the following specifications:

| Lens | Radius | Thickness | $n_d$ | $v_d$ | FRD |
|---|---|---|---|---|---|
| $L_7$ | $r_{14} = 15.8495$ | 3.0110 | 1.713 | 53.83 | 30.800 |
|  | $r_{15} = 15.8495$ | 5.5280 | 1.487 | 70.41 | 29.200 |
| $L_8$ | $r_{16} = 10.4410$ S | 5.5280 | 1.487 | 70.41 | 20.700 |
|  | $r_{17} = -15.8495$ S | 8.9400 | 1.487 | 70.41 |  |
| $L_9$ | $r_{18} = 12.0575$ | 5.8360 | 2.022 | 29.06 | 24.114 |
|  | $r_{19} = 8.5340$ | 7.8500 |  |  | 16.736 |
| IM | $r_{20} = 8.5340$ | 7.3000 | 1.515 | 47.75 | 16.736 |
| T |  | 1.1000 | 1.522 | 59.48 | 12.000 | where the over-hemispherical reflecting spherical segment surface with radius $r_{17}$ on lens $L_8$ is limited by radii −19.000 mm and −10.000 mm in front of the object-side lens vertex, $n_d$ is the refractive index of the glass, $v_d$ is the Abbe number, FRD is the free diameter, T is the object carrier, S is the reflecting surface, $L_7$ to $L_9$ are lenses, and IM is the immersion medium.

* * * * *